United States Patent
Takehana

(10) Patent No.: US 11,235,504 B2
(45) Date of Patent: Feb. 1, 2022

(54) METHOD FOR MANUFACTURING RESIN CONTAINER PART, MOLD UNIT, AND BLOW MOLDING MACHINE INCLUDING THE MOLD UNIT

(71) Applicant: NISSEI ASB MACHINE CO., LTD., Nagano (JP)

(72) Inventor: Daizaburo Takehana, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 0 days.

(21) Appl. No.: 16/963,955

(22) PCT Filed: Jan. 24, 2019

(86) PCT No.: PCT/JP2019/002280
§ 371 (c)(1),
(2) Date: Jul. 22, 2020

(87) PCT Pub. No.: WO2019/146701
PCT Pub. Date: Aug. 1, 2019

(65) Prior Publication Data
US 2021/0039299 A1 Feb. 11, 2021

(30) Foreign Application Priority Data
Jan. 26, 2018 (JP) .............................. JP2018-011806

(51) Int. Cl.
*B29C 49/06* (2006.01)
*B29C 49/48* (2006.01)
(Continued)

(52) U.S. Cl.
CPC ............ *B29C 49/06* (2013.01); *B29C 49/063* (2013.01); *B29C 49/30* (2013.01); *B29C 49/48* (2013.01);
(Continued)

(58) Field of Classification Search
CPC .............. B29C 49/4268; B29C 49/482; B29C 2049/4889; B29C 2049/023;
(Continued)

(56) References Cited

U.S. PATENT DOCUMENTS 4,298,567 A * 11/1981 Aoki ..................... B29C 65/606
264/516
5,403,538 A * 4/1995 Maeda ................ B29C 49/0073
264/530
(Continued)

FOREIGN PATENT DOCUMENTS

JP      54 52453 U    4/1979
JP      5 49016 B2    7/1993
(Continued)

OTHER PUBLICATIONS

International Search Report issued in International Patent Application No. PCT/JP2019/002280, dated Mar. 26, 2019, along with an English translation thereof.
(Continued)

*Primary Examiner* — Robert B Davis
(74) *Attorney, Agent, or Firm* — Greenblum & Bernstein, P.L.C.

(57) ABSTRACT

A method for manufacturing a resin container part includes: injection-molding of a bottomed resin preform including, on a bottom portion thereof, a thick bulging portion that retains residual heat by which the bulging portion is deformable by being pressed to follow a shape of a blow cavity mold; and a blowing including stretching a body portion of the preform by applying a blow pressure to the preform and forming a joint portion by pressing the bulging portion of the preform with an upper bottom mold to deform the bulging portion to follow the shape of the blow cavity mold.

7 Claims, 6 Drawing Sheets

(51) Int. Cl.
  *B29C 49/42* (2006.01)
  *B29C 49/30* (2006.01)
  *B29K 101/12* (2006.01)
  *B29L 31/00* (2006.01)

(52) U.S. Cl.
  CPC ........ *B29C 49/482* (2013.01); *B29K 2101/12* (2013.01); *B29L 2031/7132* (2013.01)

(58) Field of Classification Search
  CPC ... B29C 49/061; B29C 49/062; B29C 49/063; B65D 23/001; A47G 19/2255
  See application file for complete search history.

(56) References Cited

U.S. PATENT DOCUMENTS 6,640,989 B2 * 11/2003 Matsui ............... A47G 19/2255
    215/377

2014/0054829 A1 * 2/2014 Poo ........................ B29B 11/14
    264/533
2017/0157823 A1 * 6/2017 Takehana ................ B29C 45/78
2018/0257264 A1 9/2018 Kawamura et al.

FOREIGN PATENT DOCUMENTS

| | | |
|---|---|---|
| JP | 2001 39445 A | 2/2001 |
| WO | 2016 006686 A1 | 1/2016 |
| WO | 2017 090774 A1 | 6/2017 |

OTHER PUBLICATIONS

Written Opinion of the International Searching Authority issued in International Application No. PCT/JP2019/002280, dated Mar. 26, 2019, along with an English translation thereof.

* cited by examiner

METHOD FOR MANUFACTURING RESIN CONTAINER PART, MOLD UNIT, AND BLOW MOLDING MACHINE INCLUDING THE MOLD UNIT

TECHNICAL FIELD

The present invention relates to a method for manufacturing a resin container part, a mold unit, and a blow molding machine including the mold unit.

BACKGROUND ART

Patent Literature 1 discloses an injection stretch blow molding method of injection-molding a preform including a foot portion integrated with a bottom portion of a main body and performing stretch blow molding with a cup molding cavity to mold a footed cup.

Patent Literature 2 discloses a drinking container including a container portion, and a foot portion and a pedestal as an integrated member (support portion). In the drinking container, the container portion is provided with a joint portion for connecting to the support portion, and another joint portion is provided on the support portion for connecting to the container portion. The container portion and the support portion can be attached and detached by forming the corresponding joint portion with either a male screw portion or a female screw portion.

CITATION LIST

Patent Literature

Patent Literature 1: JP-B2-H05-49016
Patent Literature 2: JP-A-2001-39445

SUMMARY OF INVENTION

Technical Problem

In recent years, since copolyester resins having improved functions such as heat resistance and transparency have entered the market, a range of products in which the resins can be used instead of glass is expanding. For example, the resins may be used as a material for a wine glass and a tasting glass. The resin wine glass is less likely to break than that made of glass and is thus highly convenient when used outdoors or on a cafe terrace.

A wine glass generally includes a glass portion having a substantially U-shaped vertical cross section and for containing a drink, and an elongated foot portion having a substantially vertical T-shaped vertical cross section. Among the resin wine glasses, there is a one-piece type wine glass in which the glass portion and the foot portion are integrally molded. In addition, a two-piece type wine glass in which the glass portion and the foot portion are separate from each other is also known in consideration of circumstances such as carrying, transportation, and storage space.

In the two-piece type resin wine glass, strength is required at a connecting portion between a joint portion of the glass portion and a jointed portion of the foot portion (another member). However, in a method for manufacturing the glass portion in the related art, it is hard to say that sufficient strength can be ensured when forming the joint portion with a resin, and there is room for improvement. There is also room for improvement in molding the glass portion to have an appearance shape similar to that of a glass product.

An object of the present invention is to provide a method for manufacturing a resin container part, a mold unit, and a blow molding machine including the mold unit, by which a container part including a joint portion having high strength can be efficiently manufactured and a container part having an appearance shape similar to that of a glass product can be molded.

Solution to Problem

A method for manufacturing a resin container part according to the present invention, which can solve the above-described problem, includes:

an injection step of injection-molding a bottomed resin preform including, on a bottom portion thereof, a thick bulging portion that retains residual heat by which the bulging portion is deformable by being pressed to follow a shape of a blow cavity mold; and a blowing step including a stretching step of stretching a body portion of the preform by applying a blow pressure to the preform and a pressing step of forming a joint portion by pressing the bulging portion of the preform with an upper bottom mold to deform the bulging portion to follow the shape of the blow cavity mold.

According to the manufacturing method, the bulging portion is formed to be thick in the injection step such that high residual heat can be retained until just before the blowing step. Thereby, in the blowing step, a thick and large joint portion having high strength and a complicated shape can be efficiently molded by pressing. Accordingly, the strength and stability of a connecting portion between the molded container part (glass portion) and another part (foot portion) can be improved. In addition, with the blowing step, the body portion of the container part can be shaped into a large diameter, and an appearance shape of the container part can be molded to be similar to that of a glass product.

In addition, in the method for manufacturing a resin container part, it is preferable that in the injection step, the preform is formed by injecting a resin into a space formed by at least an injection core mold and an injection cavity mold, after the injection step, the preform and the injection core mold are accommodated in the blow cavity mold, and in the blowing step, air is introduced from the injection core mold to stretch the body portion of the preform.

In addition, in the method for manufacturing a resin container part, it is preferable that the injection core mold includes a first core mold that defines a shape of an inner surface of each of the body portion and the bottom portion of the preform, a second core mold that defines an inner surface of an opening portion of the preform, and an air outlet that is provided in a boundary region between outer peripheries of the first core mold and the second core mold, and in the blowing step, the air is introduced from the air outlet to stretch the body portion of the preform.

In addition, in the method for manufacturing a resin container part, it is preferable that in the blowing step, the first core mold is moved up and down to increase the size or decrease the size of the air outlet.

A mold unit according to the present invention, which can solve the above problems, includes at least one of:

an injection molding mold for use in an injection step of injection-molding a bottomed resin preform; and a blow molding mold for use in a blowing step of blow-molding the preform to manufacture a resin container part, in which the injection molding mold includes
an injection core mold that defines an inner shape of the preform, and
an injection cavity mold that defines an outer shape of the preform,
the injection cavity mold is provided with a bulging portion forming part for forming a thick bulging portion on a bottom portion of the preform,
the blow molding mold includes
a blow cavity mold that defines an outer shape of the container part, and
an upper bottom mold that is movable up and down toward the bulging portion of the preform, and
the blow cavity mold is provided with a joint portion forming part for forming a joint portion at a bottom portion of the container part by pressing the bulging portion with the upper bottom mold.

By using the mold unit, a container part including a sufficiently thick joint portion having high strength at a bottom portion thereof can be efficiently manufactured.

Particularly, by forming a thick bulging portion, the bulging portion can retain large residual heat until just before the blowing step. Therefore, in the blowing step, a thick and large joint portion can be efficiently molded by pressing with the upper bottom mold. Accordingly, the strength and stability of the connecting portion between the molded container part (glass portion) and another part (foot portion) can be improved. In addition, with the blowing step, the body portion of the container part can be shaped into a large diameter, and an appearance shape of the container part can be molded to be similar to that of a glass product.

In addition, in the mold unit, it is preferable that the injection core mold includes an air outlet.

In addition, in the mold unit, it is preferable that the injection core mold includes
a first core mold that defines a shape of an inner surface of each of a body portion and the bottom portion of the preform,
a second core mold that defines an inner surface of an opening portion of the preform, and
an air outlet that is provided in a boundary region between outer peripheries of the first core mold and the second core mold.

In addition, in the mold unit, it is preferable that the first core mold is configured to be movable up and down to increase the size or reduce the size of the air outlet.

Further, a blow molding machine according to the present invention, which can solve the above problems, includes the above mold unit.

Advantageous Effects of Invention

According to the present invention, it is possible to provide a method for manufacturing a resin container part, a mold unit, and a blow molding machine including the mold unit, by which a container part including a joint portion having high strength can be efficiently manufactured and a container part having an appearance shape similar to that of a glass product can be molded.

DESCRIPTION OF EMBODIMENTS

Figure 1:
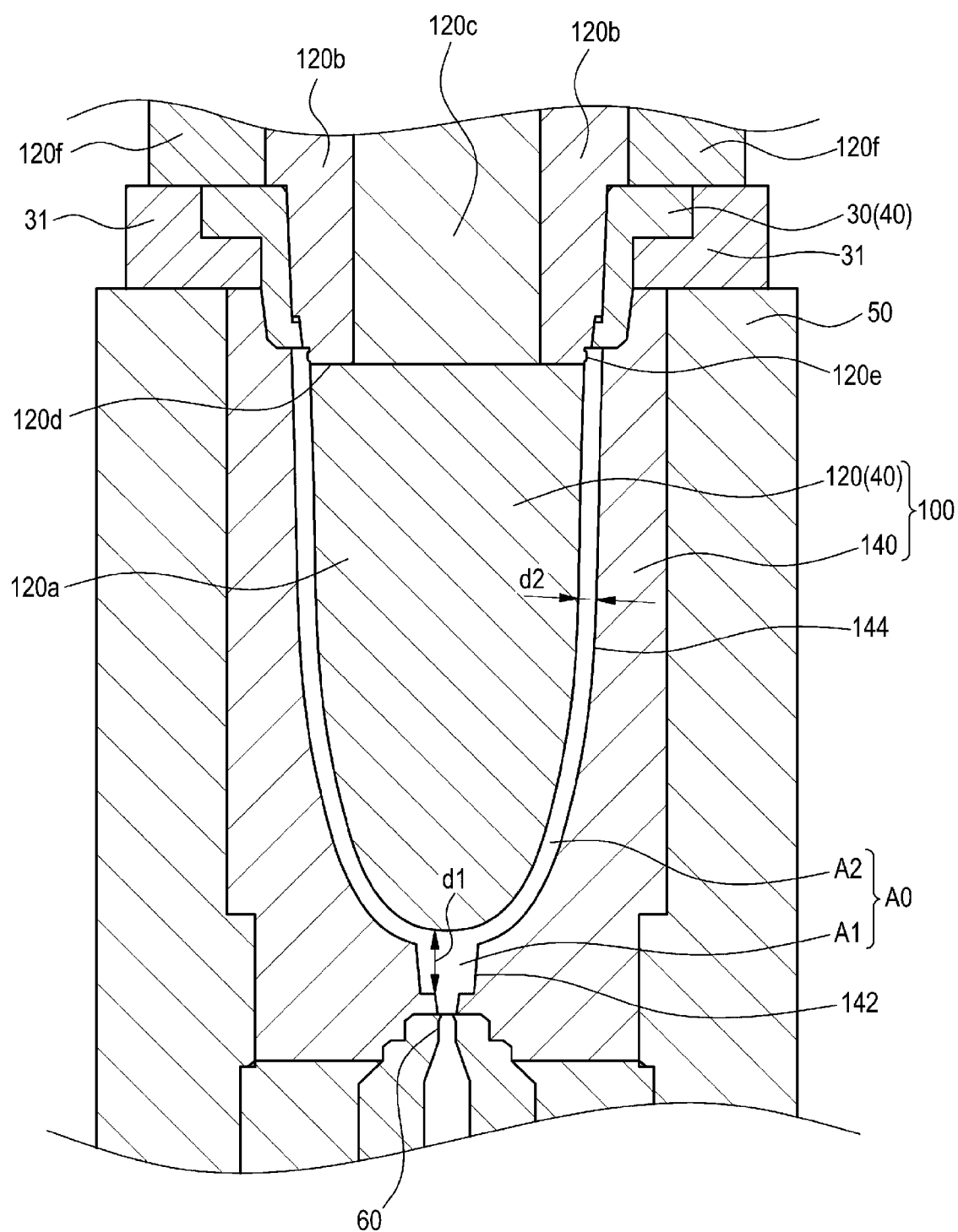
FIG. 1 is a schematic cross-sectional view of an injection molding mold.

Hereinafter, an embodiment of the present invention will be described with reference to the drawings. Dimensions of members shown in the drawings may be different from actual dimensions thereof for convenience of description. First, a mold unit according to the present embodiment will be described with reference to FIG. 1 to FIG. 4. The mold unit includes an injection molding mold 100 for injection-molding a bottomed resin preform 20, and a blow molding mold 200 for manufacturing a resin container part 10 (a part forming a glass portion of a wine glass) by blow-molding the preform 20. The mold unit is used by being mounted on a blow molding machine for manufacturing the container part 10.

Figure 5:
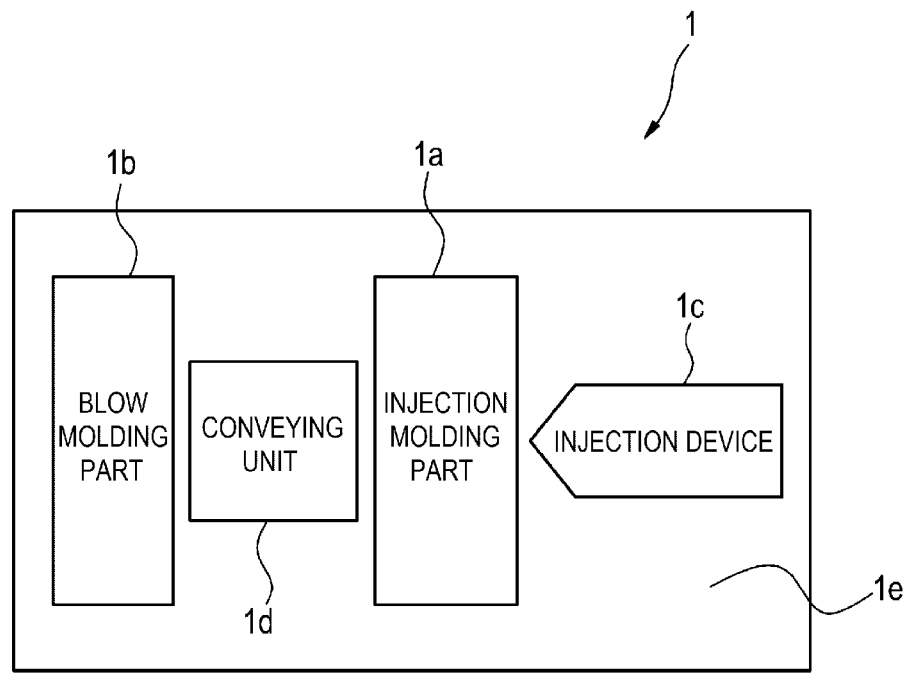
FIG. 5 is a schematic diagram of a blow molding machine.

As the blow molding machine, for example, a hot parison type blow molding machine (injection blow molding machine) such as a blow molding machine 1 shown in FIG. 5 can be used. As shown in FIG. 5, the blow molding machine 1 includes at least an injection molding part 1a for manufacturing the preform 20, a blow molding part 1b for manufacturing the container part 10 by blowing the preform 20, an injection device 1c for introducing a molding resin raw material into the mold of the injection molding part 1a, and a conveying unit 1d for conveying the preform 20 from the injection molding part 1a to the blow molding part 1b. These parts are provided above a machine base 1e of the blow molding machine 1. The injection molding part 1a and the blow molding part 1b are disposed at positions rotated by, for example, 180° about the conveying unit 1d. The conveying unit 1d includes, for example, a rotation plate, and an injection core mold member 40, which will be described later, is connected to a lower surface of the rotation plate so as to be intermittently rotatable at a horizontal angle of 180° and movable up and down. The preform 20 and the injection core mold member 40 are integrally and rotatably conveyed by the conveying unit 1d from the injection molding part 1a to the blow molding part 1b and moved up and down.

Figure 2:
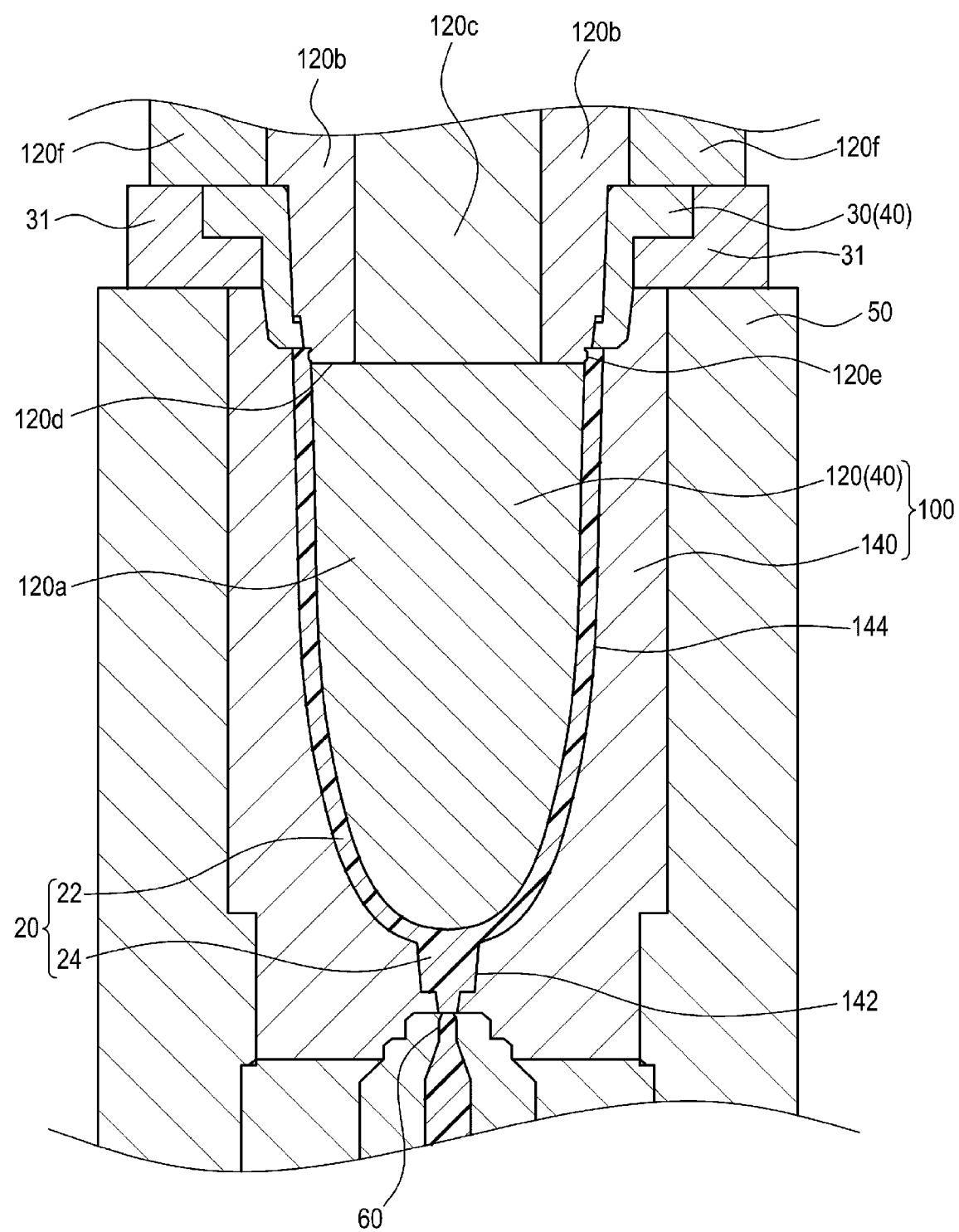
FIG. 2 is a schematic cross-sectional view showing a state where a preform is formed by using the injection molding mold.

FIG. 1 is a schematic cross-sectional view of the injection molding mold 100 according to the present embodiment, and FIG. 2 is a schematic cross-sectional view showing a state where the preform 20 is formed by the injection molding mold 100. As shown in FIG. 1 and FIG. 2, the injection molding mold 100 includes an injection core mold 120 that defines an inner shape of the preform 20 and an injection cavity mold 140 that defines an outer shape of the preform 20.

The injection core mold 120 forms a part of the injection core mold member 40 integrally including a neck mold 30. The injection core mold 120 includes a first core mold 120a that defines (forms) at least a shape of an inner surface of each of a body portion and a bottom portion of the preform 20, and a second core mold 120b that defines an inner surface of an opening portion of the preform 20. The second core mold 120b may be configured to define at least a part of an upper end surface of the opening portion of the preform 20, if necessary. In addition, although not necessary, an annular convex portion 120e is preferably provided in a region of the second core mold 120b corresponding to the inner surface of the opening portion of the preform 20 to prevent the preform 20 from falling off from the second core mold 120b during blow molding. The neck mold 30 defines the opening portion of the preform 20, and in the present embodiment, defines at least a part of the upper end surface of the opening portion of the preform 20.

A slit-shaped air outlet 120d is provided in an outer periphery of the injection core mold 120, specifically, in a boundary region between outer peripheries of the first core mold 120a and the second core mold 120b. In addition, an upper portion of the second core mold 120b is continuously provided with a rod-shaped member 120c that includes a medium supply circuit for sending a temperature adjustment medium or a cooling medium to the first core mold 120a and an air supply circuit for sending compressed air to the air outlet 120d. An injection mold holding and fixing member 120f to which the injection core mold 120 is fixed is disposed above the members forming the injection core mold 120, and is fixed to the conveying unit 1d (rotation plate). Each of the first core mold 120a, the second core mold 120b, the rod-shaped member 120c, and the neck mold 30 is connected to the injection mold holding and fixing member 120f to configure the injection core mold member 40. The neck mold 30 is a pair of split molds, and each may be slidably fixed to the injection mold holding and fixing member 120f via a fixing plate 31 of the neck mold 30. The preform 20 is held by the injection core mold member 40 and is conveyed from the injection molding part 1a to the blow molding part 1b.

The injection cavity mold 140 includes a single mold that does not open and close in a horizontal direction. However, when the preform 20 having an undercut is molded, a split mold structure that can be opened and closed in the horizontal direction may be used. The injection cavity mold 140 is in communication with a gate 60 which is an injection port of a resin raw material injected from the injection device 1c via a hot runner into a space A0 formed by the injection cavity mold 140, the injection core mold 120, and the neck mold 30. The injection cavity mold 140 is provided with a bulging portion forming part 142 for forming a thick bulging portion 24 on a bottom portion of the preform 20. A vertical length d1 of a space A1 formed by the bulging portion forming part 142 and the injection core mold 120 with respect to the injection core mold 120 is formed to be longer than a length d2 of a space A2 formed by a body portion forming part 144 for forming a body portion 22 of the preform 20 and the injection core mold 120. An end portion of the bulging portion forming part 142 is in communication with the gate 60. An injection cavity mold block 50 accommodating at least one injection cavity mold 140 is provided on an outer side of the injection cavity mold 140. The injection cavity mold 140 may have a split mold configuration in which a first injection cavity mold for forming the body portion 22 of the preform and a second injection cavity mold for forming the bulging portion forming part 142 are separated. With such a configuration, since the size and shape of the bulging portion 24 can be easily changed, convenience during molding adjustment can be improved.

Inside the injection core mold 120 and the injection cavity mold 140, a fluid circulation circuit (not shown) in which a fluid for cooling or temperature adjustment treatment circulates is provided. A temperature of the fluid is appropriately set according to cooling strength required for each of the injection core mold 120 and the injection cavity mold 140. As the resin raw material of the preform 20, for example, general polyester-based resins such as polyethylene terephthalate (PET) and polyethylene naphthalate (PEN), general-purpose polyolefin-based resins such as polypropylene (PP) and polyethylene (PE), polycarbonate (PC), polystyrene (PS), polycyclohexylene dimethylene terephthalate (PCTA), cyclic olefin polymers (COP/COC), polyether sulfone (PES), polyphenyl sulfone (PPSU), polymethyl methacrylate resins (PMMA, acrylic resin), or Tritan (trade name) can be used. In the case of using Tritan as the resin material, for example, the temperature of the fluid in the injection core mold 120 is set to 60±10° C., the temperature of the fluid in the injection cavity mold 140 is set to 70±10° C., and the temperature of the fluid in the injection cavity mold 140 is set to be relatively higher than that in the injection core mold 120. Accordingly, moldability of the body portion of the preform 20 is improved, and the container part 10 having a good appearance can be manufactured.

Figure 3:
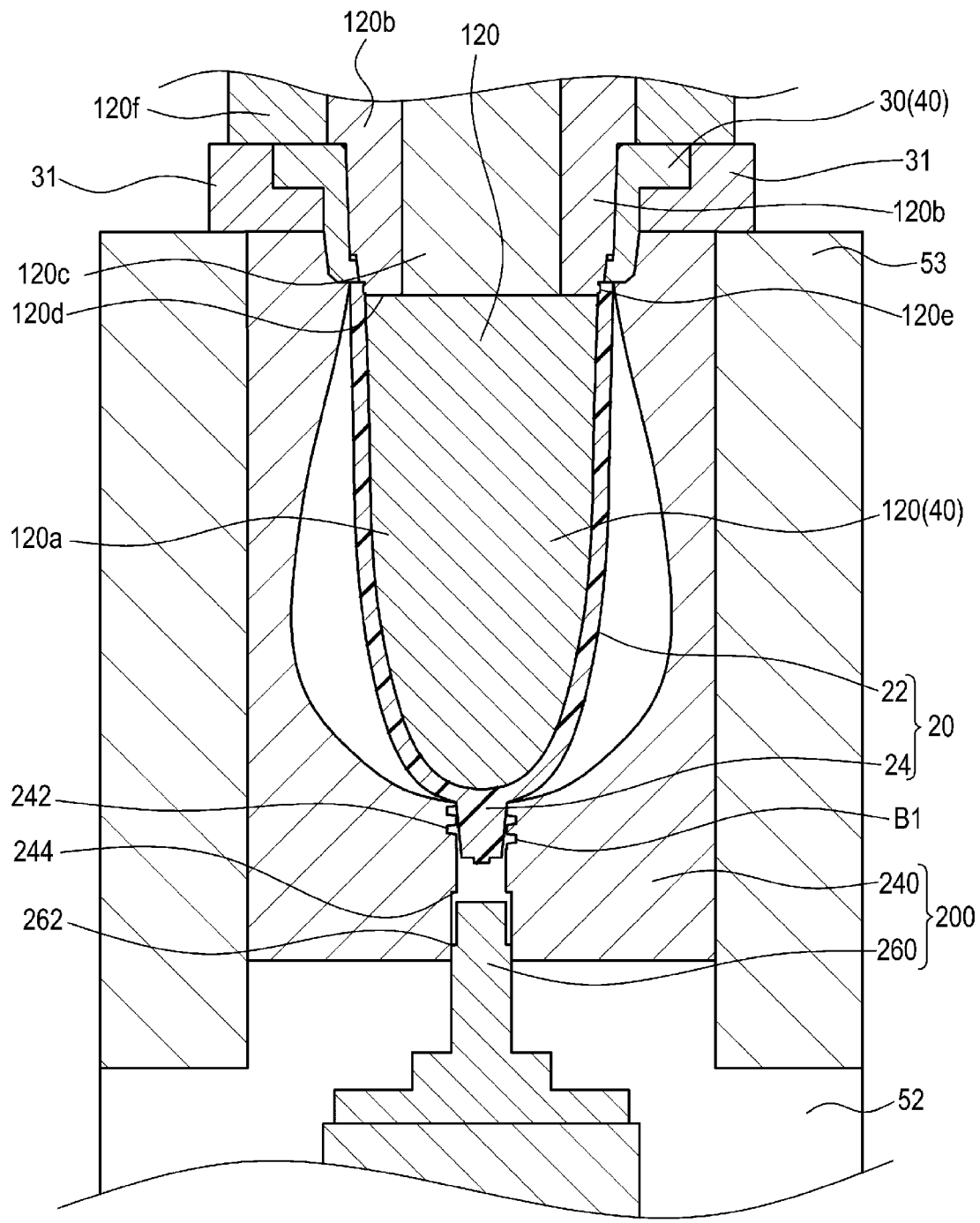
FIG. 3 is a schematic cross-sectional view showing a state where the preform is accommodated in a blow molding mold.
Figure 4:
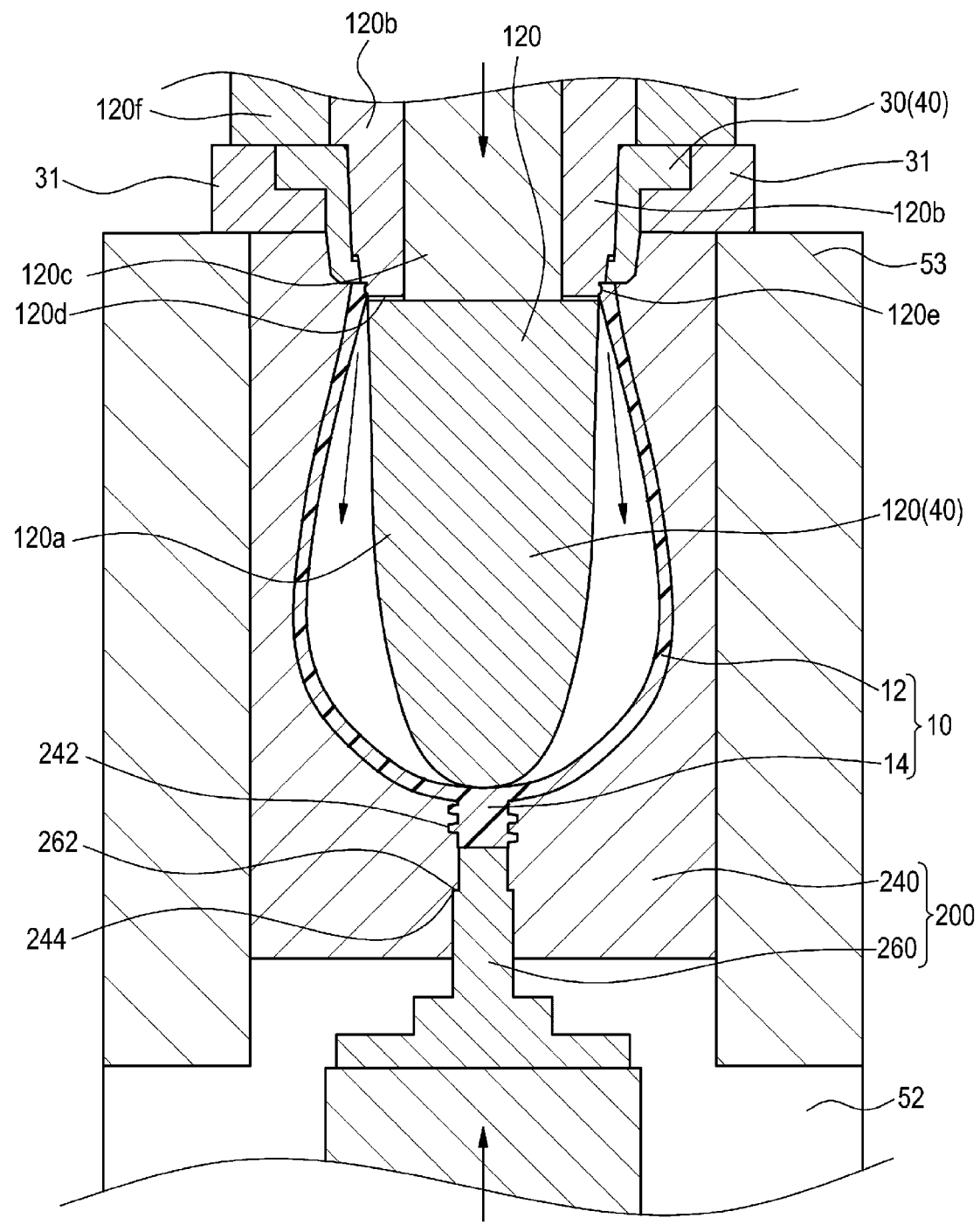
FIG. 4 is a schematic cross-sectional view showing a state where a container part is formed from the preform.

FIG. 3 is a schematic cross-sectional view showing a state where the preform 20 is accommodated in the blow molding mold 200 according to the present embodiment, and FIG. 4 is a schematic cross-sectional view showing a state where the container part 10 is formed from the preform 20. As shown in FIG. 3 and FIG. 4, the blow molding mold 200 includes a blow cavity mold 240 that defines an outer shape of the container part 10 and an upper bottom mold 260 that is movable up and down toward the bulging portion 24 of the preform 20.

Figure 7:
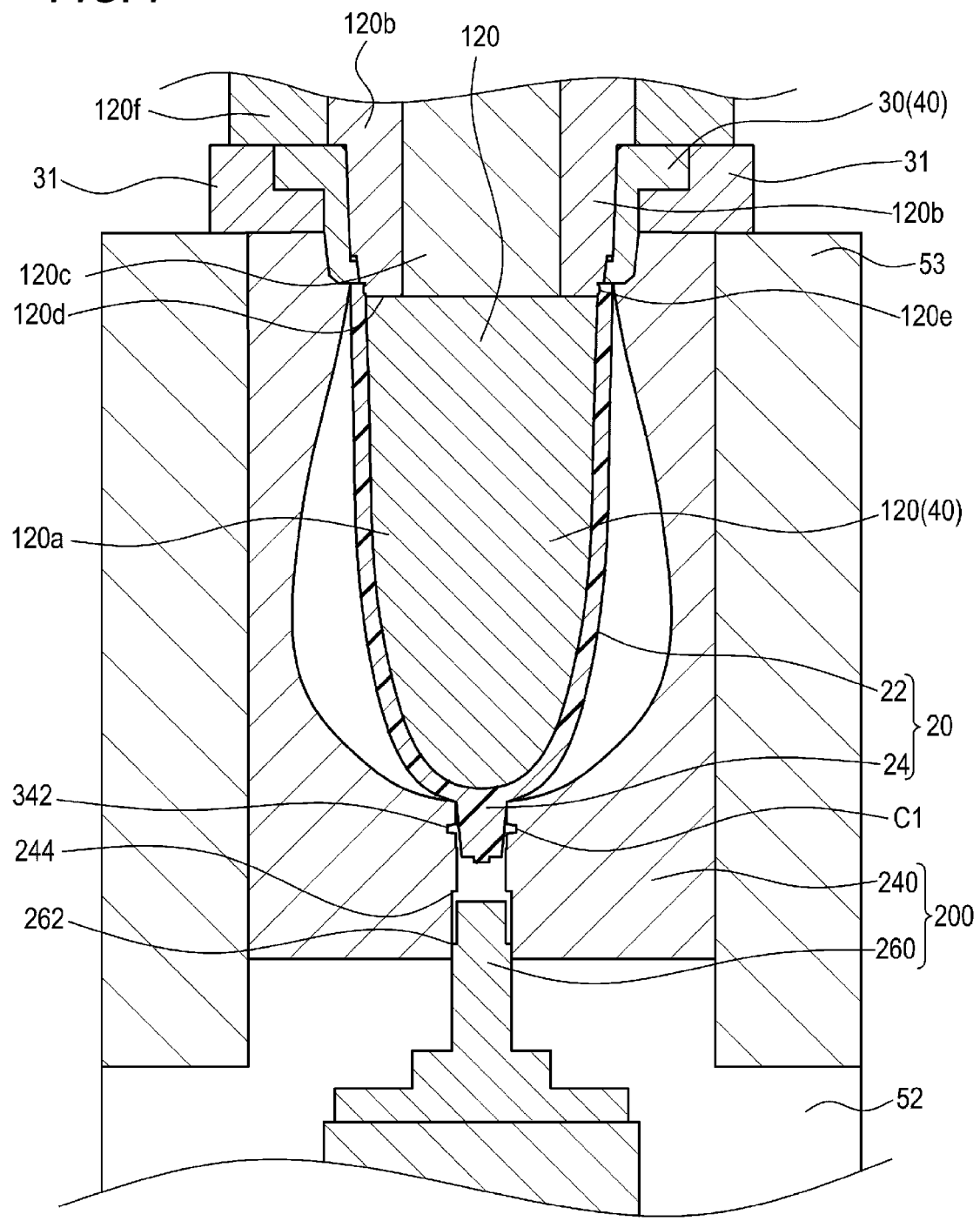
FIG. 7 is a schematic cross-sectional view showing another example of the state where the preform is accommodated in the blow molding mold.

The blow cavity mold 240 is a pair of split molds that can be opened and closed in the horizontal direction. In FIG. 3 and FIG. 4, a direction orthogonal to a paper surface of the figure shows the horizontal direction in which the blow cavity mold 240 is opened and closed. The blow cavity mold 240 is provided with a joint portion forming part 242 for forming a joint portion 14 on a bottom portion of the container part 10 by pressing the bulging portion 24 of the preform 20 with the upper bottom mold 260. The joint portion forming part 242 is a portion in which a female screw-shaped concave portion or a ring-shaped (annular flange-shaped) concave portion is engraved. For example, although FIG. 3 shows the joint portion forming part 242 having a female screw-shaped concave portion, a joint portion forming part 342 having a ring-shaped concave portion may be used as shown in FIG. 7. Here, FIG. 7 is a schematic cross-sectional view showing another example of the state where the preform is accommodated in the blow molding mold. The joint portion forming part 242 (the joint portion forming part 342 in FIG. 7) is configured such that a space B1 (a space C1 in FIG. 7) surrounded by the joint portion forming part 242 in a closed state of the blow cavity mold 240 has a size capable of accommodating the bulging portion 24 of the preform 20.

A positioning part 244 is provided below the joint portion forming part 242 of the blow cavity mold 240. The positioning part 244 is configured to come into contact with a locking part 262 provided on the upper bottom mold 260 to stop the upper bottom mold 260 from moving up when the upper bottom mold 260 moves up in a preform 20 direction. A blow base 52 is provided on an outer side of the blow cavity mold 240 in an opening/closing direction (a back side of the paper surface in FIG. 3 and FIG. 7) and is connected to a mold clamping plate movable in the horizontal direction. A pressure receiving plate 53 is provided on a side of the blow cavity mold 240. The blow cavity mold 240 and the pressure receiving plate 53 are fixed to the blow base 52. The upper bottom mold 260 can be moved up and down toward the bulging portion 24 of the preform 20 by an elevator of the blow molding machine. The blow cavity mold 240 may have a split mold configuration in which a first blow cavity mold for forming a glass portion 12 of the container part 10 and a second blow cavity mold for forming the joint portion forming part 242 are separated. With such a configuration, since the size and shape of the joint portion 14 can be easily changed, convenience during molding adjustment or specification change can be improved.

Figure 6:
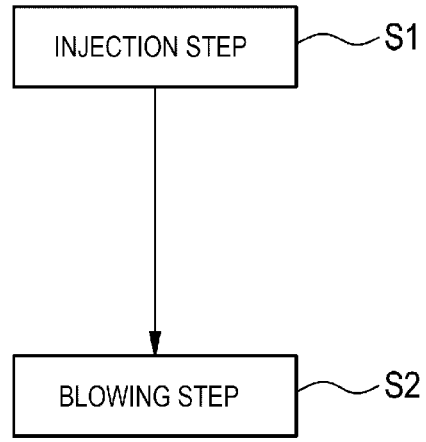
FIG. 6 is a diagram showing an outline of a method for manufacturing a container part.

Next, a method of manufacturing the resin container part 10 according to the present embodiment will be described with reference to FIG. 1 to FIG. 4 and FIG. 6. The manufacturing method includes, as shown in FIG. 6, an injection step S1 of injection-molding the preform 20 and a blowing step S2 of forming the container part 10 from the preform 20.

In the injection step S1, the injection core mold 120 of the injection core mold member 40 connected (fixed) to the conveying unit 1*d* of the molding machine is lowered and disposed inside the injection cavity mold 140. Then, in a state where the injection core mold 120 and the injection cavity mold 140 are clamped to each other (FIG. 1), the resin raw material is injected from the injection device 1*c*. The injected resin raw material passes through the gate 60 via the hot runner, and is filled in the space A0 formed between the injection core mold 120 and the injection cavity mold 140 (FIG. 2). After a certain period of time after the filling is completed, the injection core mold 120 is moved up to open the mold, and the preform 20 formed on the outer periphery of the injection core mold 120 is released from the injection cavity mold 140. Therefore, the preform 20 including the body portion 22 and the bulging portion 24 is formed.

In the injection step S1, the vertical length d1 of the space A1 formed by the bulging portion forming part 142 and the injection core mold 120 with respect to the injection core mold 120 is formed to be longer than the length d2 of the space A2 formed by the body portion forming part 144 and the injection core mold 120. Thereby, in the injection step S1, the preform 20 including, on the bottom portion thereof, the thick bulging portion 24 that retains the residual heat by which the bulging portion 24 is deformable, in the blowing step S2, by being pressed to follow a shape of the blow cavity mold 240 is formed.

Next, the blowing step S2 is performed. The injection core mold 120 whose outer periphery is formed with the preform 20 obtained in the injection step S1 is disposed inside the blow cavity mold 240 by rotating the conveying unit 180° in the horizontal direction and lowering the conveying unit. Then, the blow cavity mold 240 is closed and clamped (FIG. 3). Thereafter, air is introduced from the injection core mold 120 and a blow pressure is applied to the preform 20 to stretch the body portion 22 of the preform 20 in a lateral direction (outer diameter direction) to form the glass portion 12 of the container part 10 (stretching step S21), and the upper bottom mold 260 is moved up with respect to the bulging portion 24 of the preform 20 to press and deform the bulging portion 24 to follow the shape of the joint portion forming part 242 to form the joint portion 14 (pressing step S22) (FIG. 4). At this time, when the rod-shaped member 120*c* is slightly lowered by a push-down member located thereabove to slightly widen a gap of the air outlet 120*d*, blow air can be smoothly supplied and exhausted, and particularly, after the blow molding, it is possible to prevent the container part 10 from being unintentionally released from the injection core mold 120 or unintentionally displaced due to air remaining in the container part 10.

When the convex portion 120*e* is provided on the second core mold 120*b*, not only after the blow molding but also during the blow molding, it is possible to effectively prevent the preform 20 or the container part 10 from being released from the injection core mold 120 or displaced due to the blow air. After the completion of the blowing step S2, the push-down member is moved up and returned to the position before the blowing step S2, whereby the gap of the air outlet 120*d* can be narrowed and returned to the original state.

The pressing step S22 may be performed by moving up the upper bottom mold 260 with respect to the bulging portion 24 at the same time when the blow cavity mold 240 is closed. In the pressing step S22, as the upper bottom mold 260 moves up, the bulging portion 24 is sandwiched between the upper bottom mold 260 and the injection core mold 120, and is deformed to spread in the concave portion of the joint portion forming part 242. After performing the stretching step S21 and the pressing step S22 for a certain period of time, the blow cavity mold 240 is opened and the container part 10 is opened. Accordingly, the container part 10 including the glass portion 12 and the joint portion 14 is formed.

According to the manufacturing method of the present embodiment, the bulging portion 24 is formed to be thick in the injection step S1 such that high residual heat can be retained until just before the blowing step S2. Thereby, in the blowing step S2, the thick and large joint portion 14 having high strength and a complicated shape can be efficiently molded by pressing. Accordingly, the strength and stability of the connecting portion between the molded container part 10 (glass portion 12) and another part (foot portion) can be improved. In addition, with the blowing step S2, the body portion (glass portion 12) of the container part 10 can be shaped into a large diameter, and an appearance shape of the container part can be molded to be similar to that of a glass product.

In addition, by using the mold unit of the present embodiment, the container part 10 including the sufficiently thick joint portion 14 having high strength at a bottom portion thereof can be efficiently manufactured. Particularly, by forming the thick bulging portion 24, the bulging portion 24 can retain large residual heat until just before the blowing step S2. Therefore, in the blowing step S2, the thick and large joint portion 14 can be efficiently molded by pressing with the upper bottom mold 260. Accordingly, the strength and stability of the connecting portion between the molded container part 10 (glass portion 12) and another part (foot portion) can be improved. In addition, with the blowing step S2, the body portion (glass portion 12) of the container part 10 can be shaped into a large diameter, and an appearance shape of the container part can be molded to be similar to that of a glass product.

Specifically, while the preform 20 is detached from the injection cavity mold 140 and accommodated in the blow cavity mold 240, the thick bulging portion 24 capable of retaining residual heat is less likely to cool than the body portion 22 of the preform 20. Therefore, the bulging portion 24 is likely to deform to follow the shape of the joint portion forming part 242 of the blow cavity mold 240 whose inner wall is formed in a complicated shape, and the container part 10 can be manufactured with a high yield.

In addition, in the case of an injection blow molding method using the injection core mold 120 in both the injection step S1 and the blowing step S2, compared with the case where a stretching rod is separately used in the blowing step S2, the bulging portion 24 can be pressed earlier, and the container part 10 can be manufactured with a higher yield. That is, after the injection step S1, the preform 20 together with the injection core mold 120 is accommodated in the blow cavity mold 240, and in the blowing step S2, air is introduced from the injection core mold 120 to stretch the body portion 22 of the preform 20, whereby in the blowing step S2, the stretching and pressing of the bulging portion 24 can be quickly performed without using another member.

The present invention is not limited to the above embodiment and may be modified or improved as appropriate. Materials, shapes, sizes, numerical values, forms, numbers, arrangement places, and the like of components in the above embodiment are optional and not limited as long as the present invention can be achieved.

For example, an aspect based on the injection blow molding method is described in the above embodiment, but it can be applied to other aspects such as an injection stretch blow molding method. However, in the injection blow molding method, it is possible to manufacture the container part 10 with a higher yield as described above.

In addition, the blow molding machine 1 or the mold unit described above may include one or more injection core molds 120. The injection core mold 120 is described to form a part of the injection molding mold 100 in the above embodiment, but as described above, the injection core mold 120 may be used in the blowing step S2 in combination with the blow molding mold 200. When two or more injection core molds 120 are provided, the injection step S1 and the blowing step S2 can be performed in parallel, and the manufacturing efficiency can be improved.

The present application is based on Japanese Patent Application (No. 2018-11806) filed on Jan. 26, 2018, the entire contents of which are incorporated herein by reference. In addition, all references referred herein are entirely incorporated.

REFERENCE SIGNS LIST

1: blow molding machine
10: container part
12: glass portion
14: joint portion
20: preform
22: body portion
24: bulging portion
30: neck mold
40: injection core mold member
50: injection cavity mold block
52: blow base
60: gate
100: injection molding mold
120: injection core mold
140: injection cavity mold
142: bulging portion forming part
144: body portion forming part
200: blow molding mold
240: blow cavity mold
242: joint portion forming part
244: positioning part
260: upper bottom mold
262: locking part

The invention claimed is:

1. A method for manufacturing a resin container part, the method comprising:
   injection-molding of a bottomed resin preform including, on a bottom portion thereof, a thick bulging portion that retains residual heat by which the bulging portion is deformable by being pressed to follow a shape of a blow cavity mold; and
   blowing including stretching of a body portion of the preform by applying a blow pressure to the preform and forming a joint portion by pressing the bulging portion of the preform with an upper bottom mold to deform the bulging portion to follow the shape of the blow cavity mold
   wherein, during the injection-molding, the preform is formed by injecting a resin into a space formed by at least an injection core mold and an injection cavity mold,
   wherein, after the injection-molding, the preform and the injection core mold are accommodated in the blow cavity mold, and
   wherein, during the blowing, air is introduced from the injection core mold to stretch the body portion of the preform.

2. The method for manufacturing a resin container part according to claim 1,
   wherein the injection core mold includes
      a first core mold that defines a shape of an inner surface of each of the body portion and the bottom portion of the preform,
      a second core mold that defines an inner surface of an opening portion of the preform, and
      an air outlet that is provided in a boundary region between outer peripheries of the first core mold and the second core mold, and
   wherein, during the blowing, the air is introduced from the air outlet to stretch the body portion of the preform.

3. The method for manufacturing a resin container part according to claim 1,
   wherein, during the blowing, the first core mold is moved up and down to increase the size or decrease the size of the air outlet.

4. A mold unit comprising at least:
   an injection molding mold for use in an injection-molding of a bottomed resin preform; and
   a blow molding mold for use in a blow-molding of the preform to manufacture a resin container part,
   wherein the injection molding mold includes
      an injection core mold that defines an inner shape of the preform, and
      an injection cavity mold that defines an outer shape of the preform,
   wherein the injection cavity mold is provided with a bulging portion forming part for forming a thick bulging portion on a bottom portion of the preform,
   wherein the blow molding mold includes
      a blow cavity mold that defines an outer shape of the container part, and
      an upper bottom mold that is movable up and down toward the bulging portion of the preform,
   wherein the blow cavity mold is provided with a joint portion forming part for forming a joint portion at a bottom portion of the container part by pressing the bulging portion with the upper bottom mold, and
   wherein the injection core mold includes an air outlet.

5. A mold unit comprising at least:
   an injection molding mold for use in an injection-molding of a bottomed resin preform; and
   a blow molding mold for use in a blow-molding of the preform to manufacture a resin container part, wherein the injection molding mold includes
an injection core mold that defines an inner shape of the preform, and
an injection cavity mold that defines an outer shape of the preform,
wherein the injection cavity mold is provided with a bulging portion forming part for forming a thick bulging portion on a bottom portion of the preform,
wherein the blow molding mold includes
a blow cavity mold that defines an outer shape of the container part, and
an upper bottom mold that is movable up and down toward the bulging portion of the preform,
wherein the blow cavity mold is provided with a joint portion forming part for forming a joint portion at a bottom portion of the container part by pressing the bulging portion with the upper bottom mold, and
wherein the injection core mold includes
a first core mold that defines a shape of an inner surface of each of a body portion and the bottom portion of the preform,
a second core mold that defines an inner surface of an opening portion of the preform, and
an air outlet that is provided in a boundary region between outer peripheries of the first core mold and the second core mold.

6. The mold unit according to claim 5,
wherein the first core mold is configured to be movable up and down to increase the size or reduce the size of the air outlet.

7. A blow molding machine comprising the mold unit according to claim 4.

* * * * *